(12) United States Patent
Waje et al.

(10) Patent No.: US 12,445,934 B2
(45) Date of Patent: Oct. 14, 2025

(54) NETWORK AWARE OPTIMAL ROUTE SELECTION FOR AUTONOMOUS APPLICATIONS

(71) Applicant: T-MOBILE INNOVATIONS LLC, Overland Park, KS (US)

(72) Inventors: Sanjay Baburao Waje, Plano, TX (US); Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 369 days.

(21) Appl. No.: 18/295,644

(22) Filed: Apr. 4, 2023

(65) Prior Publication Data
US 2024/0340761 A1  Oct. 10, 2024

(51) Int. Cl.
*H04W 40/12* (2009.01)
*H04W 40/20* (2009.01)
*H04W 40/28* (2009.01)

(52) U.S. Cl.
CPC ......... *H04W 40/125* (2013.01); *H04W 40/20* (2013.01); *H04W 40/28* (2013.01)

(58) Field of Classification Search
CPC .... H04W 40/125; H04W 40/20; H04W 40/28
See application file for complete search history.

(56) References Cited

U.S. PATENT DOCUMENTS

| | | | |
|---|---|---|---|
| 2019/0049259 A1* | 2/2019 | Galan-Oliveras | G05D 1/0088 |
| 2022/0228874 A1* | 7/2022 | Nader | G08G 1/096844 |
| 2023/0194279 A1* | 6/2023 | Kakosyan | H04L 67/52 701/411 |

* cited by examiner

*Primary Examiner* — Hashim S Bhatti
(74) *Attorney, Agent, or Firm* — Shook, Hardy & Bacon L.L.P.

(57) ABSTRACT

Aspects provided herein provide methods, systems, and a non-transitory computer storage medium storing computer instructions for network aware optimal route selection for autonomous user equipment (UE) in a network. The method begins with identifying an initial route based on a mapping mechanism. An example is entering a start and ending point for a delivery using an autonomous UE. After an initial route is identified operator defined geospatial hex bins and base stations along the initial route are identified. Further identifying operations include identifying at least one flow quality of service (QoS) value that comprises a priority of at least one service and identifying at least one geospatial hex bin and associated node with a QoS value greater than an operator defined threshold. Those geospatial hex bins are then marked and excluded from the route of the autonomous UE and a revised route is transmitted to the autonomous UE.

12 Claims, 7 Drawing Sheets

NETWORK AWARE OPTIMAL ROUTE SELECTION FOR AUTONOMOUS APPLICATIONS

BACKGROUND

The growth of 5G wireless communications has brought new uses for wireless technology including autonomous vehicle applications and remote operation of devices. In these use cases a user may be at home or an office while monitoring and controlling a vehicle using control systems. These use cases need very low latency and reliable network communications with dedicated bandwidth and quality of service (QoS) for safe and proper operation. This may be particularly true for autonomous vehicle operations as safety may be compromised if operator control commands are delayed or dropped. A route for an autonomous vehicle at present does not take into account real-time network capacity and congestion metrics, thus compromising safety.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for network aware optimal route selection for autonomous applications are provided. An operator of the autonomous UE may operate a vehicle or drone in the method. The method begins with identifying an initial route based on a mapping mechanism. An example would be entering a start and ending point for a delivery using an autonomous UE. Identifying the initial route may also include identifying at least one geospatial hex bin and at least one associated node along the initial route. After an initial route is identified, operator defined geospatial hex bins and associated nodes along the initial route are identified. Flow quality of service (QoS) values may be identified, with the flow QoS value comprising a priority of at least one service. The flow QoS values are then compared with an operator defined threshold and the geospatial hex bins and associated nodes with flow QoS values exceeding the operator defined threshold are identified and marked as exclusion zones. A first revised optimal route may then be calculated which excludes the geospatial hex bins identified as exclusion zones.

A revised network optimal route may then be calculated that avoids the excluded hex bins. This revised network optimal route is then transmitted to the autonomous UE. As the autonomous UE proceeds along the revised network optimal route the operator defined key performance indicators for the geospatial hex bins along the route are continuously monitored. If the operator defined key performance indicators are exceeded the revised network optimal route may be further refined.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3-G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 32d Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. A base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 700 described herein with respect to FIG. 7.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In accordance with a first aspect of the present disclosure, a method for network aware optimal route selection for autonomous applications is provided. The method provides for identifying an initial route. Identifying the initial route includes identifying at least one geospatial hex bin and at least one associated node along the initial route. Next, at least one flow QoS flow value is identified, with the at least one flow QoS value comprising a priority of at least one service. The method continues with identifying the at least one geospatial hex bin and the at least one associated node with the at least one flow QoS value greater than an operator defined threshold. The geospatial hex bin with the at least one QoS value greater than an operator defined threshold is marked and identified as an exclusion zone. A first revised optimal route may then be calculated, that excludes the exclusion zone.

A second aspect of the present disclosure provides a system for network aware optimal route selection for an autonomous vehicle in a network. The method begins with identifying an initial route for an autonomous vehicle using a mapping mechanism. This initial route is then submitted to an optimal rate selection engine through a cloud solution. After the optimal route selection engine determined a revised route, the autonomous UE receives the revised network optimal route from the cloud solution.

Another aspect of the present disclosure is directed to a non-transitory computer storage media storing computer-useable instructions that, when used by one or more processors, cause the processors to identify an initial route for an autonomous UE, the route comprising at least one geospatial hex bin and at least one associated node. The processors then identify operator defined geospatial hex bins and base stations along the initial route. The processors then identify at least one flow QoS value that comprises a priority of at least one service. Next, the processors identify at least one geospatial hex bin and associated node with at least one flow QoS value greater than an operator defined threshold. Those geospatial hex bins having at least one flow QoS value greater than the operator defined threshold are identified and excluded when a first revised optimal route is calculated.

Figure 1:
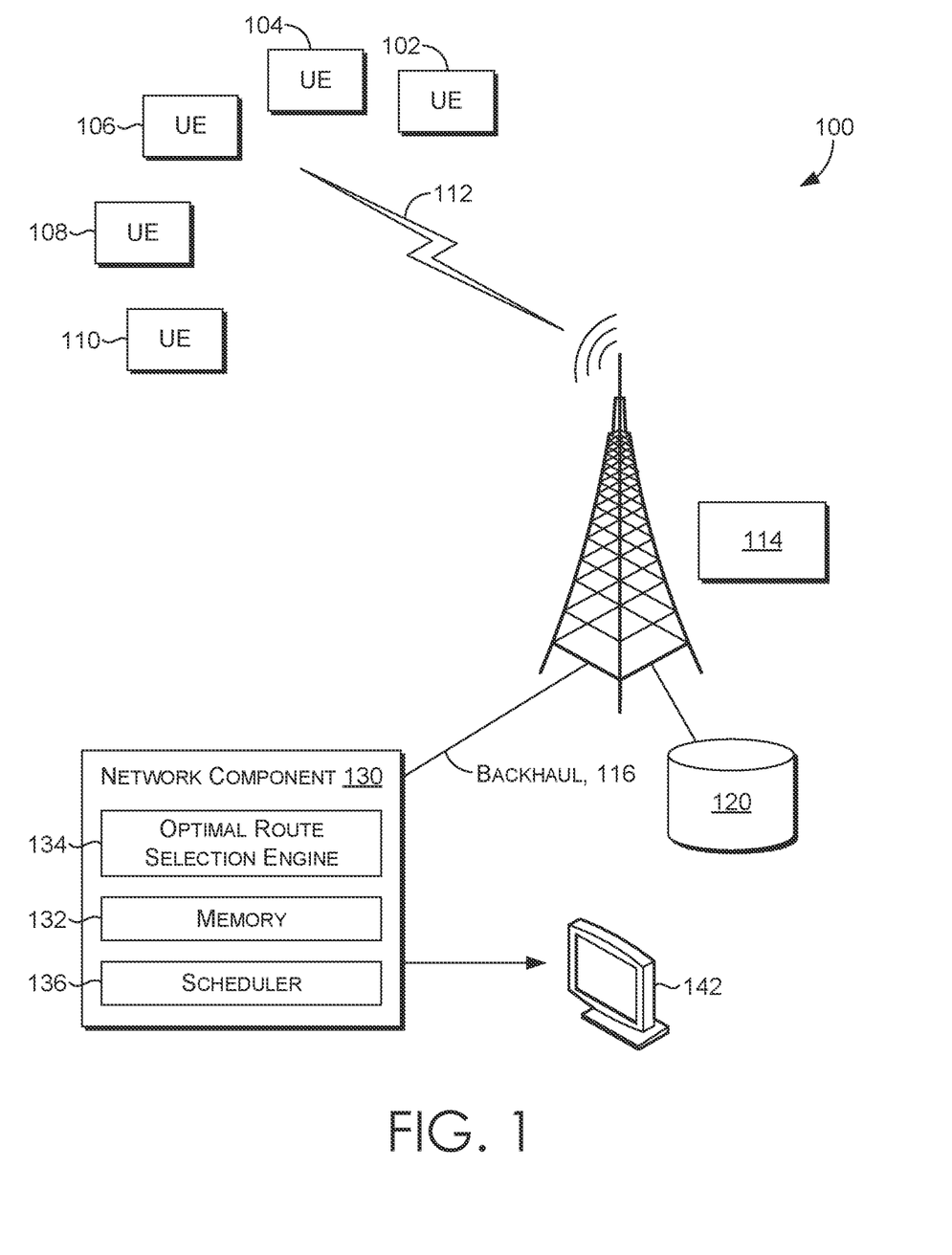
FIG. 1 depicts a diagram of an exemplary network environment in which implementations of the present disclosure may be employed, in accordance with aspects herein.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user equipment (UE) devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, an extended reality device, and any combination of these delineated devices, an autonomous vehicle or drone, or any other device (such as the computing device 700) that communicates via wireless communications with the base station 114 in order to interact with a public or private network.

Figure 7:
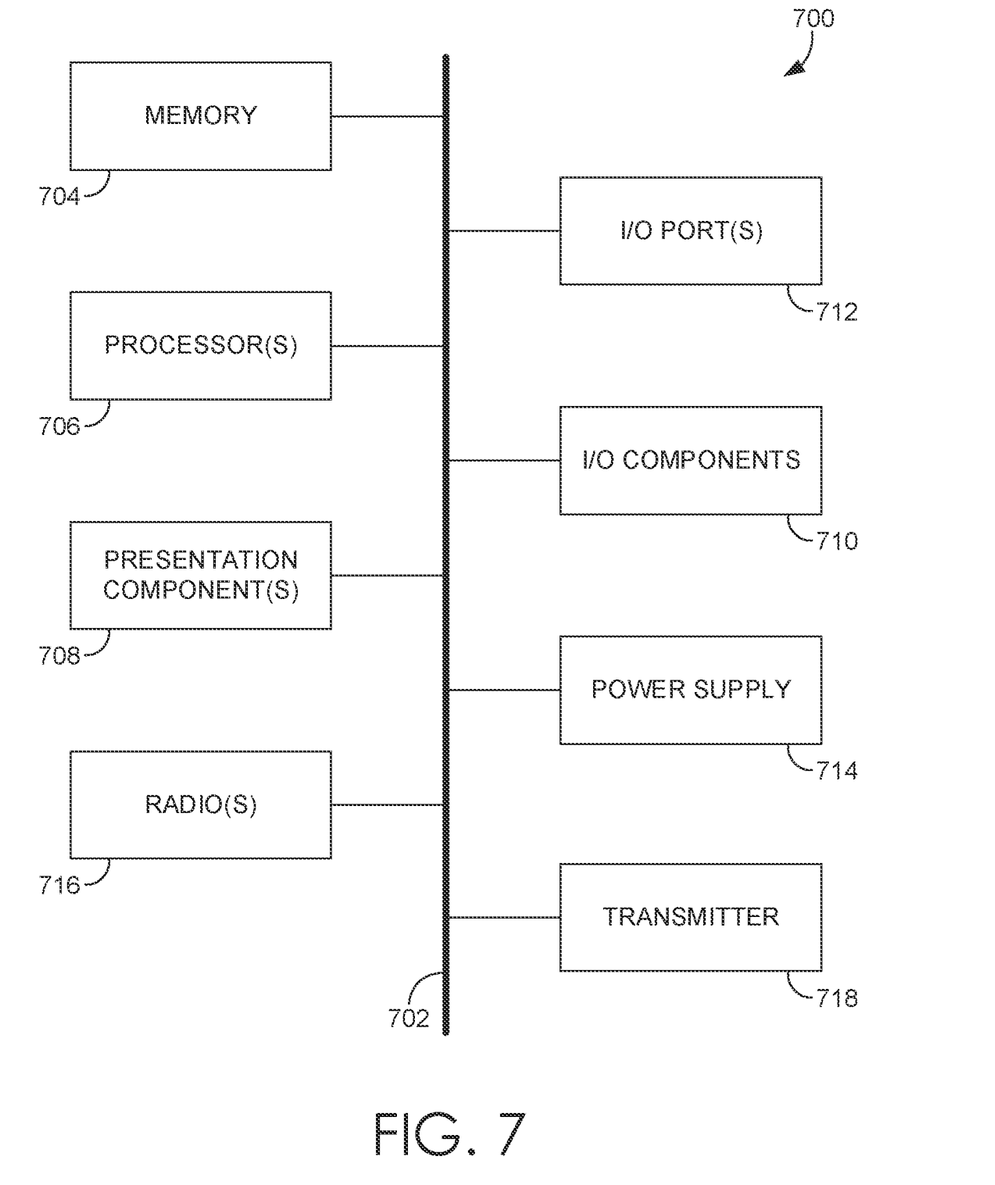
FIG. 7 depicts an exemplary computing device suitable for use in implementations of the present disclosure, in accordance with aspects herein.

In some aspects, each of the UEs 102, 104, 106, 108, and 110 may correspond to computing device 700 in FIG. 7. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G network, and the like) to user devices, such as UEs 102, 104, 106, 108, and 110. For example, the one or more communication channels may provide voice, SMS, and/or data services to UEs 102. 104, 106, 108, and 110, or corresponding users that are registered or subscribed to utilize the services provided by the telecommunications service provider. The one or more communication channels 112 can comprise, for example, a 1x circuit voice, a 3G network (e.g., CDMA, CDMA2000, WCDMA, GSM, UMTS), a 4G network (WiMAX, LTE, HSDPA), a 5G network, or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Status data may include location data of a UE, such as UEs 102, 104, 106, 108, and 110. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. The status data may include location data and routing data for autonomous vehicles and may be updated more frequently for safety. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, an optimal route selection engine 134, and a scheduler 136. All determinations, calculations, and data further generated by the optimal route selection engine 134 and scheduler 136 may be stored at the memory 132 and/or also at the data store 142. Although the network component 130 is shown as a single component comprising the memory 132, optimal route selection engine 134, and the scheduler 136, it is also contemplated that each of the memory 132, optimal route selection engine 134, and scheduler 136 may reside at different locations, be its own separate entity, and the like, within the home network carrier system.

The network component 130 is configured to retrieve signal information, UE device information, slot configuration, latency information, including quality of service (QoS) information, and metrics, including geo-spatial hex bin data from the base station 114 or one of the UEs 102, 104, 106, 108, and 110. UE device information can include a device identifier and data usage information. The scheduler 136 can monitor the activity of the UEs 102, 104, 106, 108, and 110, and in conjunction with the optimal route selection engine 134 select or modify a route taken by the autonomous vehicle.

Figure 2:
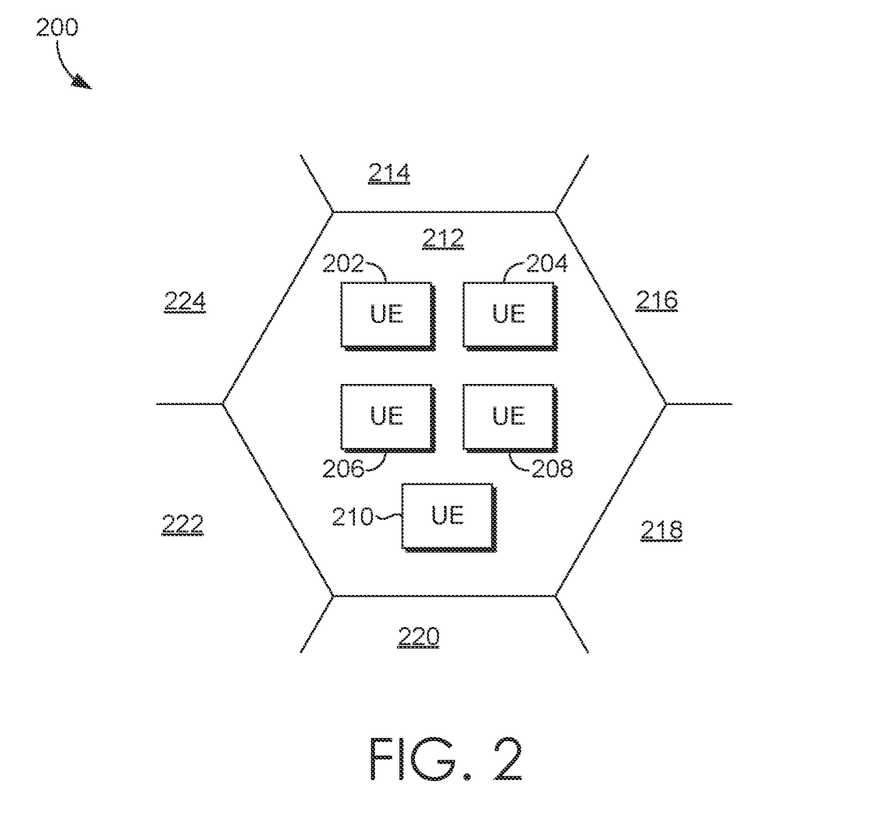
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

Geospatial data may be visualized by binning the data in hexagonal patterns. Each hex bin may be uniquely identified by its radius and latitude and longitude of its center point. Location data received from UEs may be used to assign the UE to a unique hex bin in a coverage area. The geospatial hex bins may be smaller than the hexagons of the network depicted in FIG. 2. A geospatial hex bin may have a radius different from that of the network cell coverage.

Location data received from the UE can be used to assign the UE a unique hex-bin in the particular coverage area of the UE. The coverage area of the UE may be one of the cells depicted in FIG. 2, such as 212, 214, 216, 218, 220, 222, and 224. In addition, each hex-bin may have its own key performance indicators (KPI) metrics based on cell trace, per call measurement data (PCMD) and UE-based reporting. The geospatial hex-bin data is used to dynamically reconfigure the slot format being used by the network on targeted cell sites where a non-typical traffic pattern is occurring.

Figure 3:
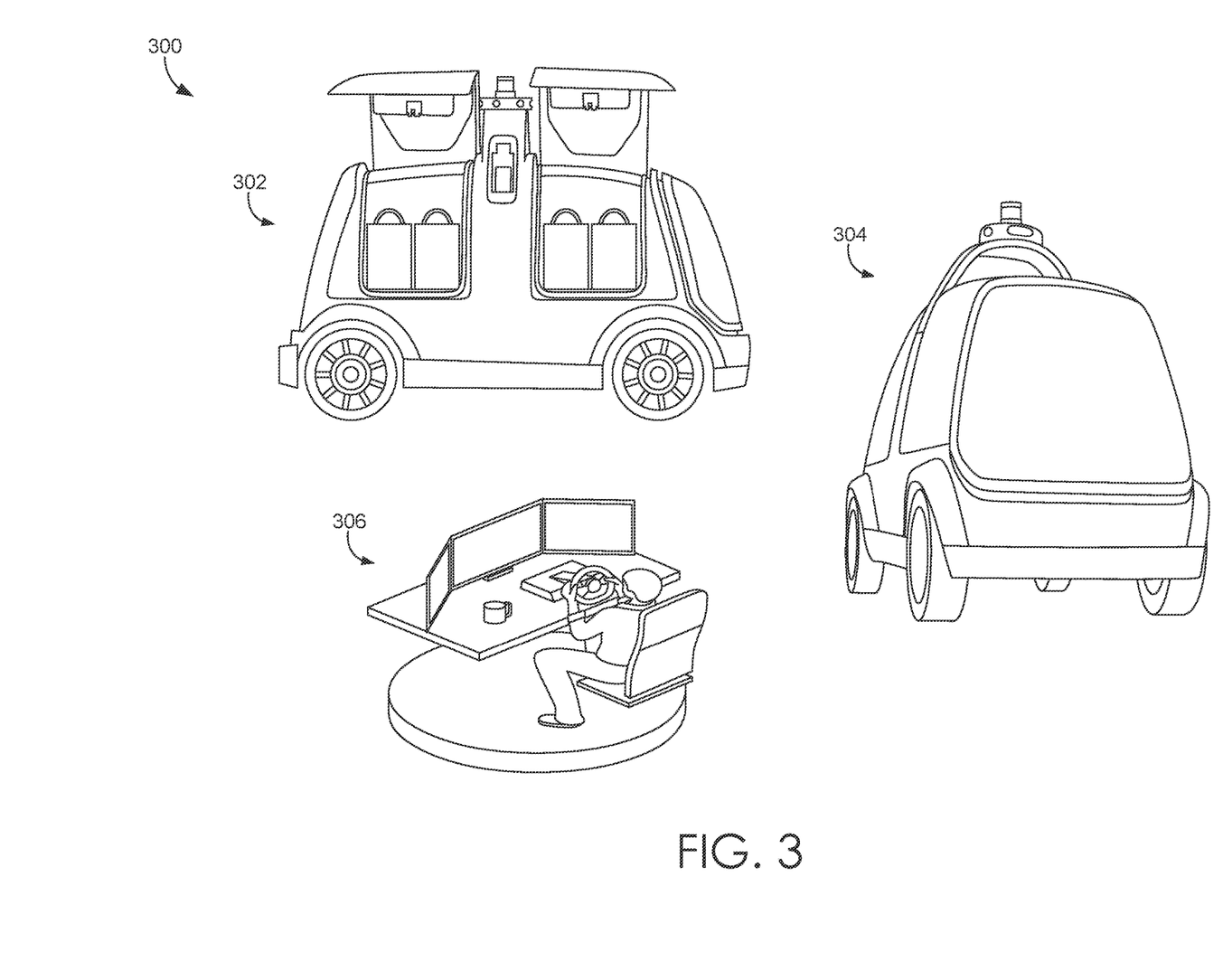
FIG. 3 depicts a use case for autonomous vehicle operation, in which implementations of the present disclosure may be employed, in accordance with aspects herein.

FIG. 3 depicts a use case for autonomous vehicle operation, in which implementations of the present disclosure may be employed. FIG. 3 illustrates an example use case 300 of autonomous UE operation, and is only one of many potential uses for the embodiments described herein. The autonomous UE is illustrated as a delivery vehicle 302. The UE has storage for bags, boxes, and containers that are to be delivered to multiple customers. The UE is controlled by the operator sitting at console 306 in FIG. 3.

The operator may control multiple UEs from the console 306, or may control only one UE. The operator uses a joystick to direct the UE as needed. The UE may be fully autonomous or may be responsive to operator control at a distance using a joystick. As depicted in FIG. 3 the in motion UE 304 moves along roads and obeys traffic signals and signs to operate safely. Operating UEs autonomously necessitates very low latency and highly reliable communication over a dedicated bandwidth for the entire route of the autonomous operation.

Congestion may occur in multiple areas of autonomous operation. Roads may be congested at certain times of day, which may pose a problem for food delivery, if delivery times are excessively delayed. Autonomous operation also utilizes significant internet bandwidth, which may also be congested. In addition, autonomous UE operation also relies heavily on cellular networks for communication, which at various times during the day may also become congested, with dropped communication posing a particular safety concern for autonomous UE operation. Autonomous UEs need near real-time control, dedicated network resources, and excellent resolution and data throughput.

Figure 4:
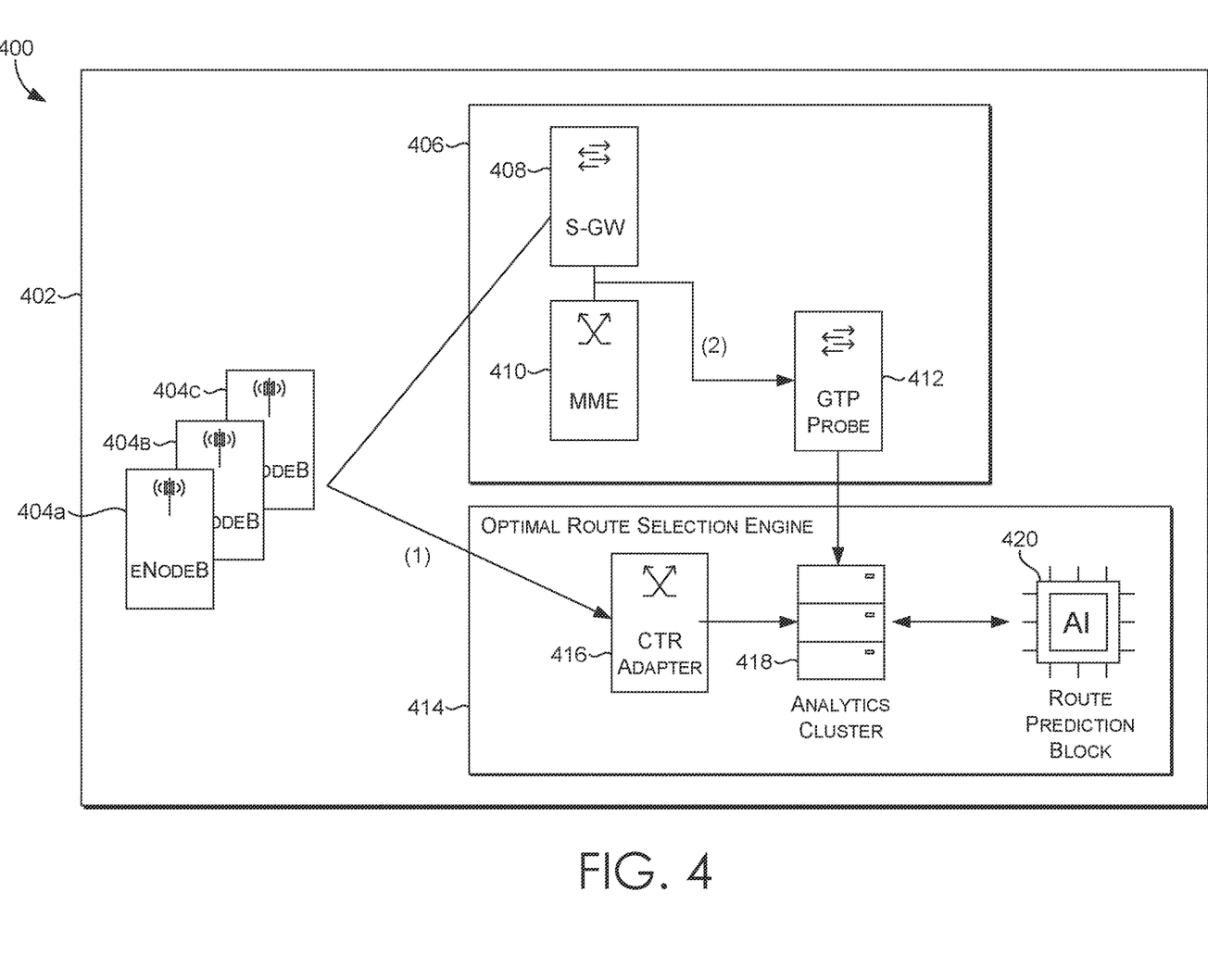
FIG. 4 is a block diagram of an architecture for network aware optimal route selection for autonomous applications, in which implementations of the present disclosure may be employed, in accordance with aspects herein.

FIG. 4 is a block diagram of an architecture for network aware optimal route selection for autonomous applications. The architecture 400 includes multiple nodes 404a, 404b, and 404c. Each node 404a, 404b, and 404c may communicate along two paths, a cellular call trace reporting (CTR) path, shown as (1) in FIG. 4 and a GPRS tunneling probe (GTP) path, shown as (2) in FIG. 4. In the CTR path the nodes 404a, 404b, and 404c may communicate with a signaling gateway (S-GW) 408. A location management entity 406 includes an S-GW 408, a mobility management entity (MME) 410, and a GTP probe 412. The S-GW 408 is a network component used for sending signaling messages between common channel signaling (CCS) nodes. The S-GW 408 is in communication with a MME 410. The MME 410 is a control node for the LTE access network and manages UE access to the network as well as mobility. In addition, the MME 410 establishes the bearer path used by the UEs and activates and deactivates bearer paths.

Both the S-GW 408 and MME 410 are in communication with GTP probe 412. The GTP probe 412 provides seamless interconnection and carries traffic between roaming or home network subscribers and key network interfaces in 4G, 5G non-standalone (NSA), 5G standalone (SA), and mobile edge computing architectures.

The eNBs 404a, 404b, and 404c may also be in communication with an optimal route selection engine 414. The optimal route selection engine 414 may include a cell trace reporting (CTR) adapter 416, analytics cluster 418, and route prediction block 420. The CTR adapter 416 may track UEs within the network and monitor location data for each UE. The CTR adapter 416 is also in communication with analytics cluster 418. The analytics cluster 418 gathers cellular network data and GTP data for analysis. The data may relate to autonomous UE route planning, starting point, destination, stops, vehicle status, serving cell, and other similar data. The analytics cluster 418 provides input to the route prediction block 420, which determines routes and modifies routes as described in more detail below.

Figure 5:
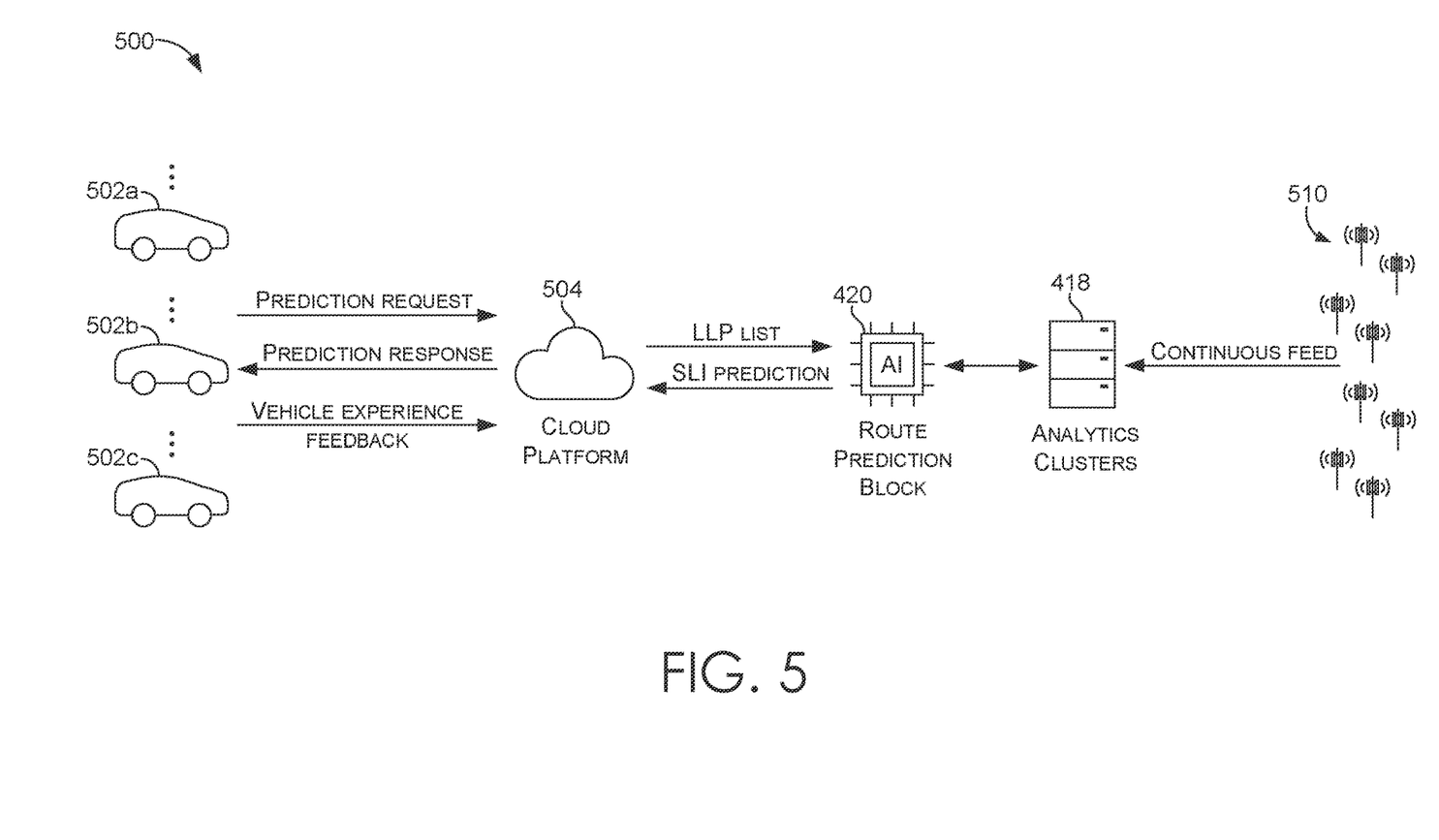
FIG. 5 depicts an overview of operation of network aware optimal route selection for autonomous applications, in which implementations of the present disclosure may be employed, in accordance with aspects herein.

FIG. 5 depicts an overview of operation of network aware optimal route selection for autonomous applications. The system 500 includes multiple autonomous UEs 502a, 502b, and 502c. Each of the autonomous UEs 502a, 502b, and 502c may send a prediction request to a cloud platform 504. The cloud platform 504 may return a prediction response to the autonomous UEs 502a, 502b, and 502c. Each of the autonomous UEs may also send vehicle experience feedback to the cloud platform 504. The vehicle experience feedback may include congestion metrics for the previously received route, signal quality measurements along the route, data rate, and similar data. The collected vehicle experience feedback may be used by the route prediction block 420 to improve future route selection and modification.

The cloud platform 504 is in communication with the route prediction block 420 which is in communication with the analytics cluster 418. The analytics cluster 418 gathers data from nodes 510 along a route of the autonomous UEs 502a, 502b, and 502c. The data from the nodes 510 may include congestion metrics, signal strength, availability of data services, and other information that may affect route selection. The route prediction block 420 may incorporate artificial intelligence (AI) to process, interpret, and refine route metrics. After analysis, the route prediction block 420 may transmit to the cloud platform 504 a route or revisions to a previously planned route. Once the autonomous UEs 502a, 502b, and 502c have received route information, they proceed along the route, transmitting data to further improve and refine the selected route.

The network aware optimal route selection for autonomous UEs begins with identifying an optimal route. The identification may use existing route applications such as Waze, iMaps, Google Maps, or similar applications. Once the optimal route from the map application has been determined, all network operator defined geospatial hex bins and nodes along the optimal route are identified.

The nodes and geospatial hex bins may use 5QI in evaluation of the route identified by the mapping application. 5QI is a pointer to a set of QoS characteristics such as priority level, packet delay, or packet error rate. 5QI may be applied to a data flow carried at some point in a bearer. 5QI values are aligned with the standardized QoS class indicators (QCIs) that are defined in standards such as 3GPP.

In 5G networks, and other advanced networks, the packet core instance plays a significant role in establishing protocol data unit (PDU) sessions, which are used to transport user plane traffic between a UE and a data network. Within each PDU session, there may be multiple service data flows (SDF). Each SDF may be a single internet protocol (IP) flow or a set of aggregated IP flows of UE traffic that is used for a specific service. Each SDF may use a different set of QoS characteristics, such as prioritization and bandwidth limits. For example, an SDF handling traffic for autonomous vehicles will need a different priority than an SDF used for internet browsing.

To ensure that the correct QoS characteristics are applied to each flow, each SDF may be bound to a QoS flow. Each QoS flow has a unique QoS profile, which identifies the QoS characteristics that are to be applied to SDFs that are bound to the particular QoS flow. Multiple SDFs with the same QoS requirements may be bound to the same QoS flow. The 5G QoS identifier (5QI) is a value that corresponds to a set of QoS characteristics that may be used for the QoS flow in question. These characteristics may include guaranteed and maximum bitrates, priority levels, as well as limits on latency, jitter, and error rate. The 5QI may be given as a scalar number.

All 5QI values with equal or higher priority relative to the service provided are then identified. As described above, the 5QI priority value for some services is higher than the 5QI value for other services. The 5QI value for an autonomous operation may be higher than the 5QI value for internet browsing at a stationary location. All hex bins and associated nodes in the route that utilize the selected 5QI values with a utilization rate greater than an operator defined threshold key performance indicator (KPI) will be identified as exclusion zones. The operator defined threshold KPI may reflect usage patterns for the hex bins in question. These higher utilization rates may make a route or a portion of the route undesirable for autonomous vehicle operation because the priority needed cannot be guaranteed for some of the hex bins. Those highly used hex bins with high usage of high priority services are excluded from inclusion when determining routing for the autonomous or remotely operated vehicle. The operator defined threshold KPIs are gleaned from historical and near real-time data from the monitoring tools. An alternate route is then calculated to avoid the exclusion zones.

Once the route has been determined the autonomous vehicle begins traversing the route. Monitoring continues for any KPI triggers or deviations along the identified route. If monitoring discloses KPI triggers occurring before completion of the route, all steps are repeated to update and provide the autonomous UE with an updated route along with information on the changes to the route and the expected service level. KPI triggers may include a sudden change or unusually high need to high priority services at a particular hex bin.

The KPI metrics used for the operator defined threshold may include: uplink throughput, video quality mean opinion score, video bitrate, video rebuffering ratio, video stall time ratio, and video freeze rate. These video metrics are closely monitored so that the remote operator monitoring the autonomous UE route may take over or implement safety precautions if the video feed is degraded or interrupted.

Figure 6:
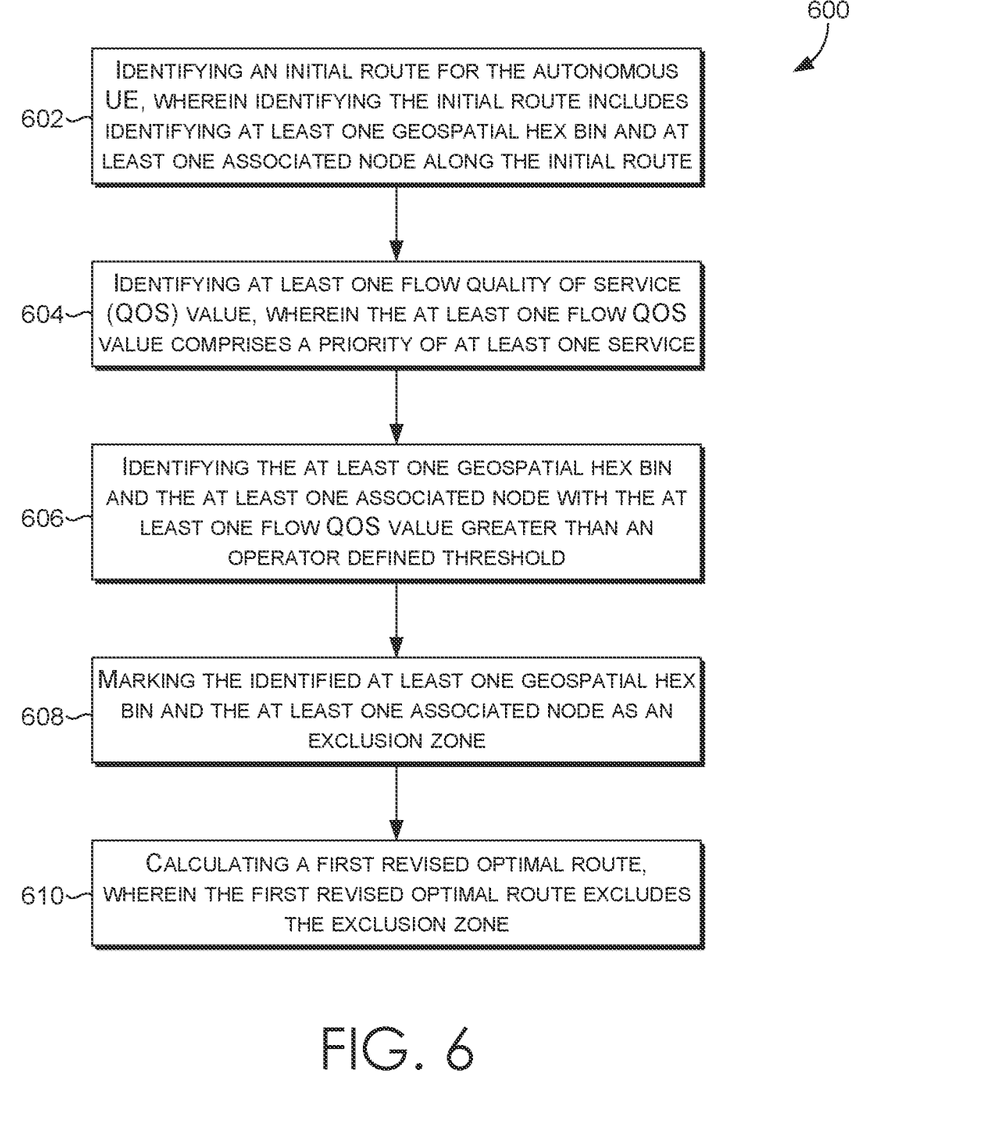
FIG. 6 is a flow diagram of an exemplary method for network aware optimal route selection for autonomous applications in an exemplary network environment, in which aspects of the present disclosure may be employed, in accordance with aspects herein.

FIG. 6 is a flow diagram of an exemplary method for network aware optimal route selection for autonomous applications in an exemplary network environment. The method 600 begins at 602 with identifying an initial route for the autonomous UE, wherein identifying the initial route includes identifying at least one geospatial hex bin and at least one associated node along the initial route. The method continues at 604 with identifying at least one flow QoS value, which comprises a priority of at least one service. Next, at 606, the method provides for identifying at least one geospatial hex bin and at least one associated node with the at least one flow QoS value greater than an operator defined threshold. Then, at 608, marking the identified at least one geospatial hex bin and the at least one associated zone as an exclusion zone occurs. The method concludes at 610 with calculating a first revised optimal route which excludes the exclusion zone.

As the autonomous UE proceeds along the route, monitoring of network parameters continues. The first revised optimal route may be further revised to produce a second revised optimal route if at least one different geospatial hex bin exceeds an operator defined threshold for the QoS flow. The second revised optimal route may then be transmitted to the autonomous UE.

The revised network optimal route may be further revised if at least one of the operator defined key performance indicators are exceeded. The operator defined key performance indicators may include at least one of the following: uplink throughput, video quality mean opinion score, video bitrate, video rebuffering ratio, video stall time ratio, and video freeze rate. The monitoring may also include monitoring nodes and geospatial hex bins along the revised network optimal route for congestion, including cellular network congestion. Cloud computing congestion may also be monitored as well as cellular network traffic metrics, base station failure indication, excessive packet loss, traffic emergencies, and stoppages.

FIG. 7 depicts an exemplary computing device suitable for use in implementations of the present disclosure, in accordance with aspects herein. With continued reference to FIG. 7, computing device 700 includes bus 702 that directly or indirectly couples the following devices: memory 704, one or more processors 706, one or more presentation components 708, input/output (I/O) ports 712, I/O components 710, radio 716, transmitter 718, and power supply 714. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O components 710. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 704 includes computer-storage media in the form of volatile and/or nonvolatile memory. Memory 704 may be removable, nonremovable, or a combination thereof. Exemplary memory includes solid-state memory, hard drives, optical-disc drives, etc. Computing device 700 includes one or more processors 706 that read data from various entities such as bus 702, memory 704 or I/O components 710. One or more presentation components 708 present data indications to a person or other device. Exemplary one or more presentation components 708 include a display device, speaker, printing component, vibrating component, etc. I/O ports 712 allow computing device 700 to be logically coupled to other devices including I/O components 710, some of which may be built into computing device 700. Illustrative I/O components 710 include a microphone, joystick, game pad, satellite dish, scanner, printer, wireless device, etc.

The radio 716 represents one or more radios that facilitate communication with a wireless telecommunications network. While a single radio 716 is shown in FIG. 7, it is contemplated that there may be more than one radio 716 coupled to the bus 702. In aspects, the radio 716 utilizes a transmitter 718 to communicate with the wireless telecommunications network. It is expressly conceived that a computing device with more than one radio 716 could facilitate communication with the wireless telecommunications network via both the first transmitter 718 and an additional transmitters (e.g. a second transmitter). Illustrative wireless telecommunications technologies include CDMA, GPRS, TDMA, GSM, and the like. The radio 716 may additionally or alternatively facilitate other types of wireless communications including Wi-Fi, WiMAX, LTE, 3G, 4G, LTE, 5G, NR, VOLTE, or other VoIP communications. As can be appreciated, in various embodiments, radio 716 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of facilitating optimal route selection for autonomous user equipment (UE) in a network, the method comprising:
    identifying an initial route for the autonomous UE, wherein identifying the initial route includes identifying at least one geospatial hex bin and at least one associated node along the initial route;
    identifying at least one flow quality of service (QoS) value, wherein the at least one flow QoS value comprises a priority of at least one service;
    identifying the at least one geospatial hex bin and the at least one associated node with the at least one flow QoS value greater than an operator defined threshold;
    marking the identified at least one geospatial hex bin and the at least one associated node as an exclusion zone; and
    calculating a first revised optimal route, wherein the first revised optimal route excludes the exclusion zone.

2. The method of claim 1, further comprising revising the first revised optimal route to produce a second revised optimal route if at least one different geospatial hex bin exceeds an operator defined threshold for the at least one flow QoS value.

3. The method of claim 2, further comprising transmitting the second revised optimal route to the autonomous UE.

4. The method of claim 1, wherein the operator defined threshold of the at least one flow QoS value comprises at least one of the following: uplink throughput, video quality mean opinion score, video bitrate, video rebuffering ratio, video stall time ratio, and video freeze rate.

5. The method of claim 1, further comprising monitoring at least one geospatial hex bin in the first revised optimal route for congestion.

6. The method of claim 5, wherein the congestion is cellular network congestion.

7. The method of claim 5, wherein the congestion is cloud computing congestion due to high internet traffic.

8. The method of claim 2, wherein the operator defined threshold is an operator defined key performance indicator.

9. The method of claim 5, wherein the monitoring further includes monitoring the first revised network optimal route for traffic emergencies and stoppages.

10. A non-transitory computer storage media storing computer-useable instructions that, when used by one or more processors, cause the processors to:
    identify an initial route for an autonomous UE, wherein identify the initial route includes instructions to identify at least one geospatial hex bin and at least one associated node along the initial route;
    identify at least one flow quality of service (QoS) value, wherein the at least one flow QoS value comprises a priority of at least one service;
    identify the at least one geospatial hex bin and the at least one associated node with the at least one flow QoS value greater than an operator defined threshold;
    mark the identified at least one geospatial hex bin and the at least one associated node as an exclusion zone; and
    calculate a first revised optimal route, wherein the first revised optimal route excludes the exclusion zone.

11. The non-transitory computer storage media of claim 10, further comprising revise the first revised optimal route to produce a second revised optimal route if at least one different geospatial hex bin has exceeds the operator defined threshold for the at least one flow QoS value.

12. The non-transitory computer storage media of claim 11, further comprising transmit the second revised optimal route to the autonomous UE.

* * * * *